US011919084B2

(12) United States Patent
Muneuchi et al.

(10) Patent No.: US 11,919,084 B2
(45) Date of Patent: Mar. 5, 2024

(54) ELECTRONIC COMPONENT AND METHOD FOR MANUFACTURING THE SAME

(71) Applicant: Murata Manufacturing Co., Ltd., Kyoto-fu (JP)

(72) Inventors: Keita Muneuchi, Tsurugashima (JP); Eiji Iso, Tsurugashima (JP); Isao Ida, Tsurugashima (JP); Kenichi Araki, Nagaokakyo (JP); Noriko Shimizu, Nagaokakyo (JP); Takashi Tomohiro, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

(21) Appl. No.: 17/820,786

(22) Filed: Aug. 18, 2022

(65) Prior Publication Data

US 2022/0392687 A1 Dec. 8, 2022

Related U.S. Application Data

(60) Division of application No. 15/967,126, filed on Apr. 30, 2018, now Pat. No. 11,488,760, which is a (Continued)

(30) Foreign Application Priority Data

Feb. 1, 2016 (JP) ................................ 2016-017042

(51) Int. Cl.
*H01F 27/255* (2006.01)
*B22F 1/102* (2022.01)
(Continued)

(52) U.S. Cl.
CPC ............... *B22F 3/24* (2013.01); *B22F 1/102* (2022.01); *C22C 32/0094* (2013.01); (Continued)

(58) Field of Classification Search
CPC ........................................................ B22F 1/10
See application file for complete search history.

(56) References Cited

U.S. PATENT DOCUMENTS 3,011,920 A * 12/1961 Shipley, Jr. .............. H01B 1/00 106/1.11
10,340,072 B2 7/2019 Kitajima et al.
(Continued)

FOREIGN PATENT DOCUMENTS

CN 101111903 A 1/2008
CN 104347228 A 2/2015
(Continued)

OTHER PUBLICATIONS

An Office Action mailed by the China National Intellectual Property Administration dated Jul. 12, 2019, which corresponds to Chinese Patent Application No. 201780003068.7 and is related to U.S. Appl. No. 15/967,126 with English language translation.
(Continued)

*Primary Examiner* — Ian A Rummel
(74) *Attorney, Agent, or Firm* — Studebaker & Brackett PC

(57) ABSTRACT

An electronic component includes an element body made of a composite material of a resin material and metal powder. A plurality of particles of the metal powder are exposed from the resin material and make contact with one another on the outer surface of the element.

3 Claims, 7 Drawing Sheets

Related U.S. Application Data continuation of application No. PCT/JP2017/001789, filed on Jan. 19, 2017.

(51) Int. Cl.

| | |
|---|---|
| ***B22F 1/16*** | (2022.01) |
| ***B22F 3/24*** | (2006.01) |
| ***C22C 32/00*** | (2006.01) |
| ***H01F 1/147*** | (2006.01) |
| ***H01F 1/20*** | (2006.01) |
| ***H01F 17/00*** | (2006.01) |
| ***H01F 17/04*** | (2006.01) |
| ***H01F 27/29*** | (2006.01) |
| ***H01F 41/04*** | (2006.01) |
| *H01F 1/22* | (2006.01) |

(52) U.S. Cl.

CPC ........... *H01F 1/14733* (2013.01); *H01F 1/20* (2013.01); *H01F 17/0013* (2013.01); *H01F 17/04* (2013.01); *H01F 27/255* (2013.01); *H01F 27/292* (2013.01); *H01F 41/046* (2013.01); *B22F 2998/10* (2013.01); *B22F 2999/00* (2013.01); *C22C 2202/02* (2013.01); *H01F 1/22* (2013.01); *H01F 2017/0066* (2013.01); *H01F 2017/048* (2013.01); *Y10T 428/325* (2015.01)

(56) References Cited

U.S. PATENT DOCUMENTS

| | | | | |
|---|---|---|---|---|
| 2008/0042505 | A1* | 2/2008 | Gerster | ................ H01F 41/024 310/152 |
| 2010/0061877 | A1 | 3/2010 | Sadaka et al. | |
| 2014/0132383 | A1 | 5/2014 | Matsuura et al. | |
| 2015/0028983 | A1 | 1/2015 | Ryu et al. | |
| 2015/0371752 | A1 | 12/2015 | Park et al. | |
| 2016/0035476 | A1 | 2/2016 | Mimura et al. | |

FOREIGN PATENT DOCUMENTS

| | | | |
|---|---|---|---|
| JP | 2001-155950 | A | 6/2001 |
| JP | 2013-211333 | A | 10/2013 |
| JP | 2014-225590 | A | 12/2014 |
| JP | 2015-026812 | A | 2/2015 |
| JP | 2016-004814 | A | 1/2016 |
| JP | 2016-009858 | A | 1/2016 |
| WO | 2015/115180 | A1 | 8/2015 |

OTHER PUBLICATIONS

International Search Report issued in PCT/JP2017/001789; dated Mar. 28, 2017.

Written Opinion issued in PCT/JP2017/001789; dated Mar. 28, 2017.

* cited by examiner

NO LASER IRRADIATION

5W/mm$^2$

12W/mm$^2$

ELECTRONIC COMPONENT AND METHOD FOR MANUFACTURING THE SAME

CROSS-REFERENCE TO RELATED APPLICATION

This application is a Divisional of U.S. patent application Ser. No. 15/967,126 filed on Apr. 30, 2018, which claims benefit of priority to International Patent Application No. PCT/JP2017/001789, filed Jan. 19, 2017, and to Japanese Patent Application No. 2016-017042, filed Feb. 1, 2016, the entire contents of each are incorporated herein by reference.

BACKGROUND

Technical Field

The present invention relates to an electronic component and a method for manufacturing the same.

Background Art

An existing electronic component has been disclosed in Japanese Unexamined Patent Application Publication No. 2013-211333. The electronic component includes a coil, a core made of a composite material of a resin material and metal powder and covering the coil, and an outer electrode provided on the surface of the core. The outer electrode is formed by applying pastes containing thermosetting resin and Ag particles to the core surface by dip coating.

SUMMARY

In the above-described existing electronic component, the outer electrode is formed by the pastes containing the thermosetting resin and the Ag particles and the thermosetting resin is therefore interposed between the adjacent Ag particles. This causes a problem that a contact resistance of the outer electrode is increased to lower the efficiency of a product.

As a result of intensive studies, the inventors of the present application have focused on formation of an outer electrode by performing plating directly on a core in order to provide the outer electrode with a low resistance, and have reached the present disclosure. The present disclosure provides an electronic component in which an outer electrode with a low resistance can be easily formed, and a method for manufacturing the same.

An electronic component according to an aspect of the present disclosure includes an element body made of a composite material of a resin material and metal powder, wherein a plurality of particles of the metal powder are exposed from the resin material and make contact with one another on an outer surface of the element body.

The exposure used herein includes not only exposure to the outside of the electronic component but also exposure to another member, that is, exposure in a boundary surface to another member. That is to say, the plurality of particles are not necessarily required to be exposed to the air and may be exposed from the resin material but covered with a metal film. The metal film functions as an outer electrode.

With the electronic component according the aspect of the present disclosure, some particles of the metal powder are exposed from the resin material and make contact with one another on the outer surface of the element body. That is to say, the particles configure a network structure connected with one another. Accordingly, when the metal film such as the outer electrode is formed by performing plating directly on the element body, an electric current is easy to be supplied with the network structure of the metal powder and a plating deposition speed is improved, thereby easily forming the metal film with a low resistance.

In one embodiment of the electronic component according to the aspect of the disclosure, the particles are bonded to one another by being molten. With the above-described embodiment, the particles are bonded to one another by being molten. With this, the network structure of the metal powder becomes strong and the metal film is formed more easily.

In one embodiment of the electronic component according to the aspect of the disclosure, the outer surface of the element body has an exposure region in which the metal powder is exposed from the resin material, and a ratio of the metal powder the particles of which make contact with one another per unit cross-sectional area in the element body is lower than a ratio of the metal powder the particles of which make contact with one another per unit cross-sectional area in the exposure region on the outer surface of the element body. The exposure region used herein is a region in which the metal film and the element body make contact with each other.

With the above-described embodiment, the ratio of the metal powder the particles of which make contact with one another in the element body is lower than the ratio of the metal powder the particles of which make contact with one another on the outer surface of the element body. Therefore, insulation property can be kept in the element body and voltage endurance can be improved.

Furthermore, in one embodiment of the electronic component according to the aspect of the disclosure, a metal film is provided on the outer surface of the element body, and the metal film makes contact with the particles. With the above-described embodiment, the metal film makes contact with the particles that are exposed from the resin material and make contact with one another. Therefore, the metal film can be formed by performing plating directly on the element body and the metal film with a low resistance can be formed easily.

In addition, in one embodiment of the electronic component according to the aspect of the disclosure, a metal film is provided on a part of the outer surface, an insulating film is provided on another part of the outer surface, and the metal film makes contact with the particles. With the above-described embodiment, the metal film is arranged on a part of the outer surface and the insulating film is provided on a part of the outer surface on which the metal film is not formed. Therefore, insulating property of the electronic component can be ensured. The metal film can be selectively formed using the insulating film as a mask in the plating. It should be noted that the insulating film and the metal film may be partially overlapped with each other. For example, the metal film may be formed on the insulating film.

Furthermore, in one embodiment of the electronic component according to the aspect of the disclosure, the metal powder contains, in addition to powder (hereinafter, also referred to as first powder) of Fe or alloy containing Fe, powder (hereinafter, also referred to as second powder) of at least one metal of Pd, Ag, and Cu or alloy containing metal selected from Pd, Ag, and Cu. With the above-described embodiment, the metal powder contains at least one metal of Pd, Ag, and Cu and the at least one metal thereof can therefore be used as a plating catalyst, thereby improving productivity of plating. Particle size distribution of the first powder may have a plurality of peak positions. A filling rate of the first powder in the element body can be improved by causing the particle size distribution of the first powder to have the plurality of peak positions, thereby improving magnetic permeability.

In one embodiment of the electronic component according to the aspect of the disclosure, particle size distribution of the metal powder has a plurality of peak positions, and the metal powder the particles of which make contact with one another is present in a region from the outer surface of the element body to a depth equivalent to twice a maximum peak position among the plurality of peak positions. With the above-described embodiment, the metal powder the particles of which make contact with one another is present in the region from the outer surface of the element body to the depth equivalent to twice the maximum peak position of the particle size distribution of the metal powder. Therefore, the outer surface of the element body has conductivity whereas the insulation property is kept in the element body, thereby improving voltage endurance.

In one embodiment of the electronic component according to the aspect of the disclosure, the metal powder the particles of which make contact with one another is present in a region from the outer surface of the element body to a depth of 100 μm. With the above-described embodiment, the metal powder the particles of which make contact with one another is present in the region from the outer surface of the element body to the depth of 100 μm. Therefore, the conductivity of the outer surface of the element body and the insulating property in the element body can be ensured.

In one embodiment of the electronic component according to the aspect of the disclosure, the outer surface of the element body has an exposure region in which the metal powder is exposed from the resin material, and a ratio of an exposure area of the metal powder relative to an area of the exposure region is equal to or higher than 30%. The exposure region herein is a region in which the metal film and the element body make contact with each other. With the above-described embodiment, the ratio of the exposure area of the metal powder relative to the area of the exposure region on the outer surface of the element body is equal to or higher than 30%. Therefore, the conductivity of the outer surface of the element body can be ensured.

A method for manufacturing an electronic component according to another aspect of the present disclosure includes irradiating an outer surface of an element body made of a composite material of a resin material and metal powder with laser such that a plurality of particles of the metal powder are exposed from the resin material and make contact with one another. With the method for manufacturing the electronic component, the outer surface of the element body is irradiated with the laser to cause some (particles) of the metal powder to be exposed from the resin material and cause the particles to make contact with one another. With this, the particles configure a network structure connected with one another. Accordingly, when a metal film such as an outer electrode is formed by performing plating directly on the element body, an electric current is easy to be supplied with the network structure of the metal powder and a plating deposition speed is improved, thereby easily forming the metal film with a low resistance.

In one embodiment of the method for manufacturing the electronic component according to the aspect of the disclosure, the particles are molten and bonded to one another by irradiating the outer surface with the laser in the irradiating. With the above-described embodiment, at least some particles of the metal powder, which make contact with one another, are molten with the laser and bonded to one another. Therefore, the network structure of the metal powder becomes strong and the metal film is formed more easily.

One embodiment of the method for manufacturing the electronic component according to the aspect of the disclosure includes forming a metal film covering the particles on a surface of the element body, which has been irradiated with the laser, by plating the element body. With the above-described embodiment, the particles of the metal powder are exposed from the resin material and make contact with one another on a laser irradiation surface of the element body. Therefore, the metal film can be formed by performing plating directly on the element body and the metal film with a low resistance can be formed easily.

In one embodiment of the method for manufacturing the electronic component according to the aspect of the disclosure further includes applying a plating catalyst to a surface of the element body, which has been irradiated with the laser, between the irradiating of laser and the forming of metal film. With the above-described embodiment, the metal film is formed using plating after the plating catalyst is applied to the laser irradiation surface of the element body, thereby improving productivity of the plating.

With the electronic component according the present disclosure, some particles of metal powder are exposed from the resin material and make contact with one another on the outer surface of the element body and the outer electrode with a low resistance can be formed easily.

DETAILED DESCRIPTION

Figure 1:
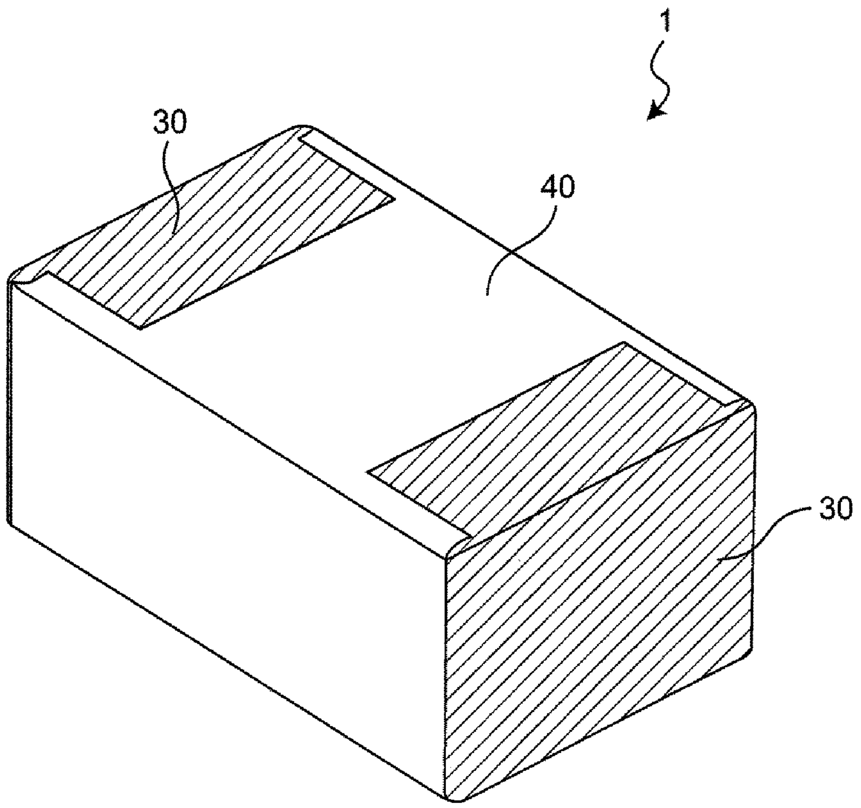
FIG. 1 is a perspective view illustrating an embodiment of an electronic component according to the present disclosure.

Hereinafter, the present disclosure will be described more in detail using an embodiment in the drawings.

Embodiment

Figure 2:
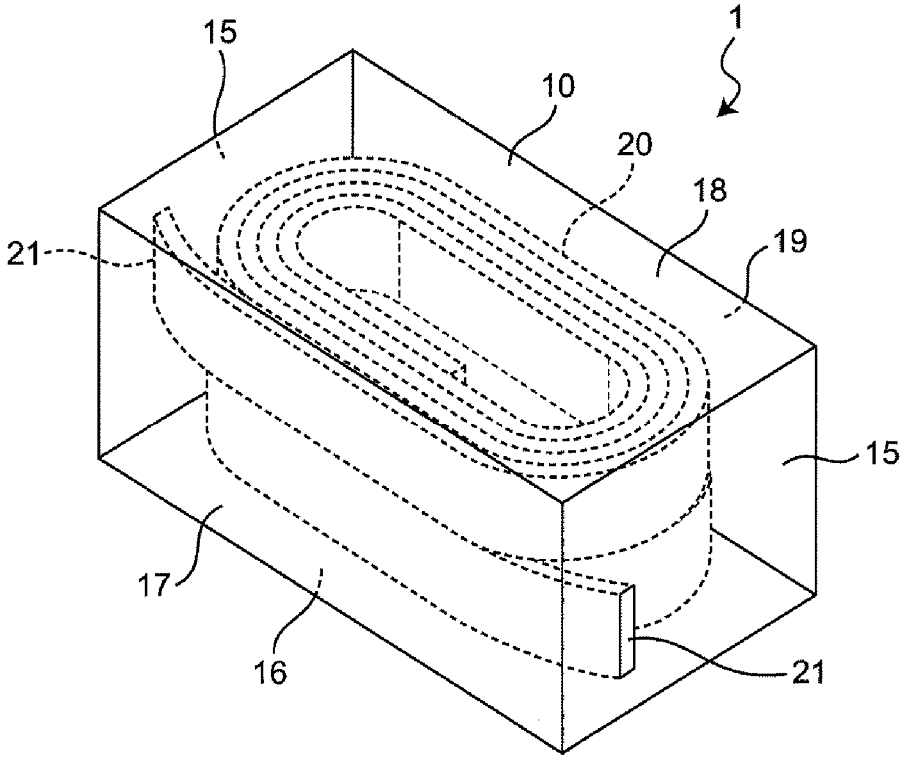
FIG. 2 is a perspective view in a state in which the configuration of a part of the electronic component is omitted.
Figure 3:
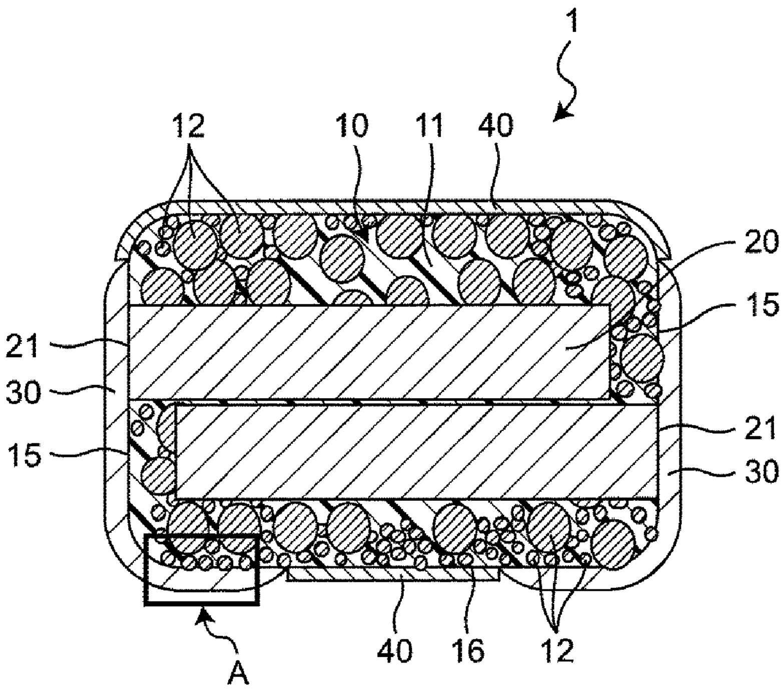
FIG. 3 is a cross-sectional view of the electronic component.

FIG. 1 is a perspective view illustrating an embodiment of an electronic component according to the present disclosure. FIG. 2 is a perspective view in a state in which the configuration of a part of the electronic component is omitted. FIG. 3 is a cross-sectional view of the electronic component. As illustrated in FIG. 1, FIG. 2, and FIG. 3, an electronic component 1 is a coil component. The electronic component 1 includes an element body 10, a coil conductor

20 that is provided in the element body 10, outer electrodes 30 that are provided on the outer surfaces of the element body 10 and are electrically connected to the coil conductor 20, and insulating films 40 that are provided on the outer surfaces of the element body 10. In FIG. 1, the outer electrodes 30 are illustrated in a hatched manner.

The element body 10 is made of a composite material of a resin material 11 and metal powder 12. Examples of the resin material 11 include organic materials such as polyimide resin and epoxy resin. For example, the metal powder 12 may be powder of Fe or powder of alloy containing Fe, such as FeSiCr. The metal powder 12 may contain both of the powder of Fe and the powder of the alloy containing Fe. The metal powder 12 may contain at least one metal of Pd, Ag, and Cu in addition to the powder of Fe or the alloy containing Fe. The metal powder 12 may be powder of crystalline metal (or alloy) or may be powder of amorphous metal (or alloy). It should be noted that the surface of the metal powder 12 may be covered with an insulating film.

The element body 10 is formed to have a rectangular parallelepiped shape, for example. The element body 10 has both end surfaces 15 and 15 opposing each other and first to fourth side surfaces 16 to 19 between the end surfaces 15 and 15. The first to fourth side surfaces 16 to 19 are aligned in order in a circumferential direction. The first side surface 16 is a mounting surface when the electronic component 1 is mounted. The third side surface 18 opposes the first side surface 16. The second side surface 17 and the fourth side surface 19 oppose each other.

The coil conductor 20 contains a conductive material such as Au, Ag, Cu, Pd, Ni and the like, for example. The surface of the conductive material may be covered with an insulating film. The coil conductor 20 is formed by being wound into a spiral form at two stages such that both of end portions 21 and 21 are located on the outer circumference thereof. That is to say, the coil conductor 20 is formed by winding a rectangular conducting wire in an outside-to-outside manner. The one end portion 21 of the coil conductor 20 is exposed from the one end surface 15 of the element body 10 and the other end portion 21 of the coil conductor 20 is exposed from the other end surface 15 of the element body 10. The shape of the coil conductor 20 is not particularly limited.

The outer electrodes 30 are metal films that are provided on the outer surfaces of the element body 10 and are formed using plating. The metal films are made of a metal material such as Au, Ag, Pd, Ni, Cu and the like, for example. It should be noted that each outer electrode 30 may have a lamination structure in which the surface of the above-described metal film is further covered with another plating film. Hereinafter, the outer electrodes 30 are explained as being formed by single layers of the above-described metal films.

The outer electrodes 30 are provided at both of the sides of the end surfaces 15 of the element body 10. As is described in detail, the one outer electrode 30 is continuously provided on the one end surface 15 overall and the first side surface 16 at the one end surface 15 side. The other outer electrode 30 is continuously provided on the other end surface 15 overall and the first side surface 16 at the other end surface 15 side. That is to say, each outer electrode 30 is formed to have an L shape. The one outer electrode 30 is electrically connected to the one end portion 21 of the coil conductor 20 and the other outer electrode 30 is electrically connected to the other end portion 21 of the coil conductor 20.

It should be noted that portions of the outer electrodes 30, which are located on the end surfaces 15, may be covered with insulating films and only portions of the outer electrodes 30, which are located on the first side surface 16, may be exposed to the outside. That is to say, the outer electrodes 30 may be formed as a bottom electrode.

The insulating films 40 are provided on the outer surfaces of the element body 10 on which no outer electrode 30 is arranged. The insulating films 40 may be made of a resin material having a high electric insulating property, such as acrylic resin, epoxy resin, and polyimide and the like, for example.

Figure 4:
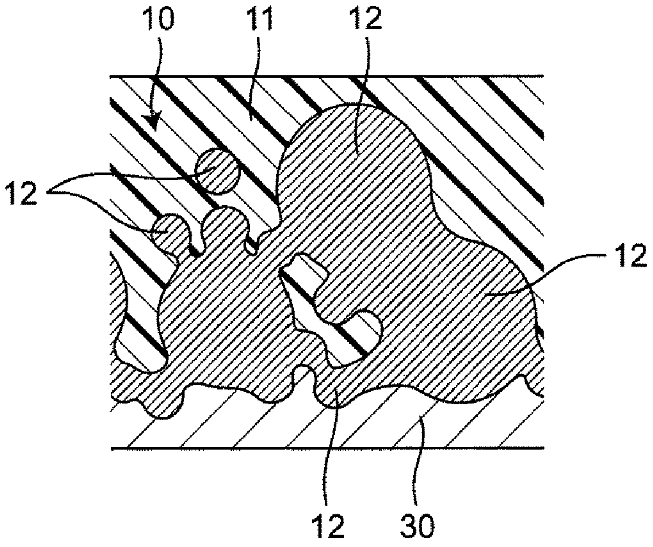
FIG. 4 is an enlarged view of an A part of FIG. 3.
Figure 5:
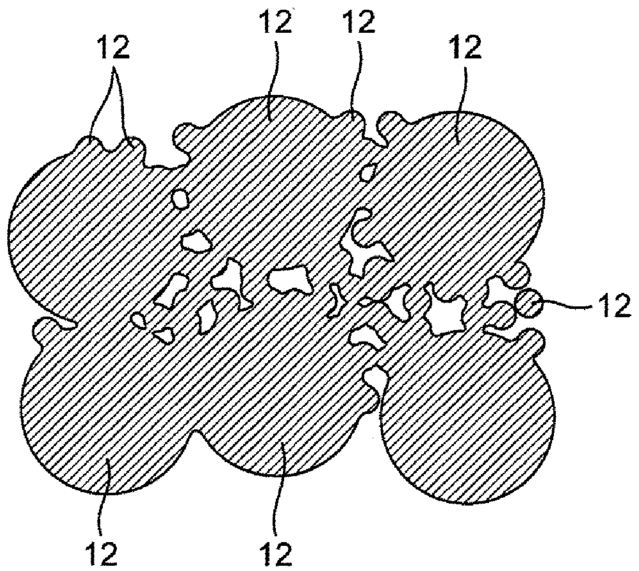
FIG. 5 is a plan view of metal powder in an outer surface of an element body.

FIG. 4 is an enlarged view of an A part of FIG. 3. FIG. 5 is a plan view of the metal powder in the outer surface of the element body 10. As illustrated in FIG. 4 and FIG. 5, the plurality of particles of metal powder 12 are exposed from the resin material 11 and make contact with the outer electrodes 30 on the outer surfaces of the element body 10, which are covered with the outer electrodes 30. The exposure herein includes not only exposure to the outside of the electronic component 1 but also exposure to another member, that is, exposure in a boundary surface to another member.

At least some of the plurality of particles of the metal powder 12, which are exposed, make contact with one another. That is to say, the plurality of particles of the metal powder 12 configure a network structure connected with one another. At least some particles of the metal powder 12, which make contact with one another, are bonded to one another. That is to say, the particles of the metal powder 12 are bonded to one another by being molten and so on, for example.

The network structure of the metal powder 12 is formed by irradiating the outer surfaces of the element body 10 with laser, for example. That is to say, the resin material 11 in the outer surfaces of the element body 10 are removed with the laser to cause the metal powder 12 from the resin material 11 and cause the particles of the metal powder 12 to make contact with one another. Furthermore, the metal powder 12 is molten with the laser and the particles of the metal powder 12 are bonded to one another. In this case, the metal powder 12 molten with the laser is a molten solid body. The shape of the metal powder 12 becomes a non-spherical shape by being molten. That is to say, the electronic component of the present disclosure includes the molten solid body containing at least Fe. The molten solid body is present in the surface of the element body 10 and makes contact with the outer electrodes 30 (metal films).

Thus, the outer surfaces of the element body 10 have exposure regions in which the metal powder 12 is exposed from the resin material 11. The exposure regions herein are regions in which the element body 10 and the outer electrodes 30 (metal films) make contact with each other. In other words, the exposure regions are regions (laser target regions, which will be described later) irradiated with the laser.

Figure 6:
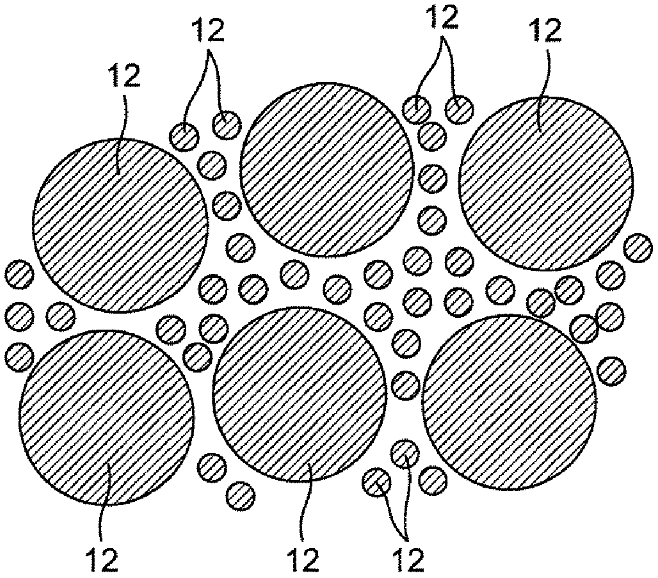
FIG. 6 is a cross-sectional view illustrating a state of the metal powder in the element body.

FIG. 6 is a cross-sectional view illustrating a state of the metal powder in the element body 10. As illustrated in FIG. 6, the adjacent particles of the metal powder 12 are separated from one another and do not make contact with one another in the element body 10. The shape of each particle of the metal powder 12 is a spherical shape. That is to say, the metal powder 12 is hard to receive heat with laser irradiation and is difficult to be deformed in the element body 10. As described above, a ratio (see FIG. 6) of the metal powder 12 the particles of which make contact with one another per unit cross-sectional area in the element body 10 is lower than a ratio (see FIG. 5) of the metal powder 12 the particles of which make contact with one another per unit cross-sectional area in the exposure regions on the outer surfaces of the element body 10. The cross-sectional area is a cross section in the planar direction. It should be noted that the particles of the metal powder 12 may make contact with one another in the element body 10.

Preferably, particle size distribution of the metal powder 12 has a plurality of peak positions, and the particles of the metal powder 12 (that is, the network structure), which make contact with one another, are present in regions from the outer surfaces of the element body 10 to a depth equivalent to twice a maximum peak position among the plurality of peak positions. As is described in detail, when the maximum peak position of the particle size distribution of the metal powder 12 is 50 μm, the particles of the metal powder 12, which make contact with one another, are present in regions from the outer surfaces of the element body 10 to a depth of 100 μm. The particle size distribution is measured using a laser diffraction particle size distribution meter.

Preferably, the ratio of the exposure area of the metal powder 12 relative to the area of the exposure regions on the outer surfaces of the element body 10 is equal to or higher than 30%. The area is measured by binarizing the area of the metal powder and the area of the resin using a contrast difference between light elements and heavy elements using a reflection electron image under an electron microscope.

Next, a method for manufacturing the electronic component 1 will be described.

First, the coil conductor 20 is provided in the element body 10. In this case, the end portions 21 of the coil conductor 20 are exposed from the end surfaces 15 of the element body 10. As a method for providing the coil conductor 20, there are the following methods. As one method, coil conductor pastes and pastes containing metal magnetic powder are formed by screen printing or the like and printing lamination is sequentially repeated to form a block body. Thereafter, the block body is fragmented to form sintered bodies. As another method, a coil conductor is embedded in a core (element body) obtained by molding the metal magnetic powder. As still another method, a plurality of coil conductors are aligned and are collectively embedded in a sheet containing the metal magnetic powder to be solidified, and then, the sheet is fragmented by cutting it with a dicing machine or the like. All of these methods provide the configuration in which the overall element body is covered with a mixture of the metal magnetic powder and resin or a sintered body of the metal magnetic powder and coil extended portions are exposed to end portions thereof.

Figure 7:
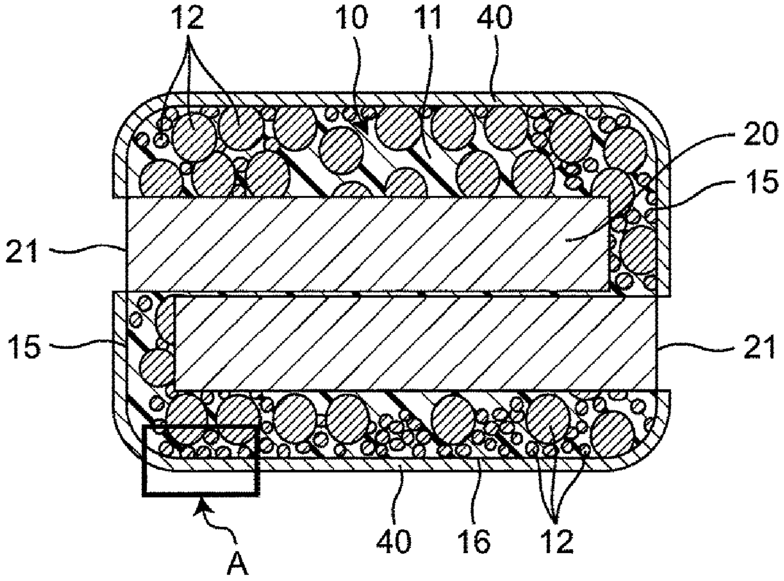
FIG. 7 is a descriptive view for explaining a method for manufacturing the electronic component.
Figure 8:
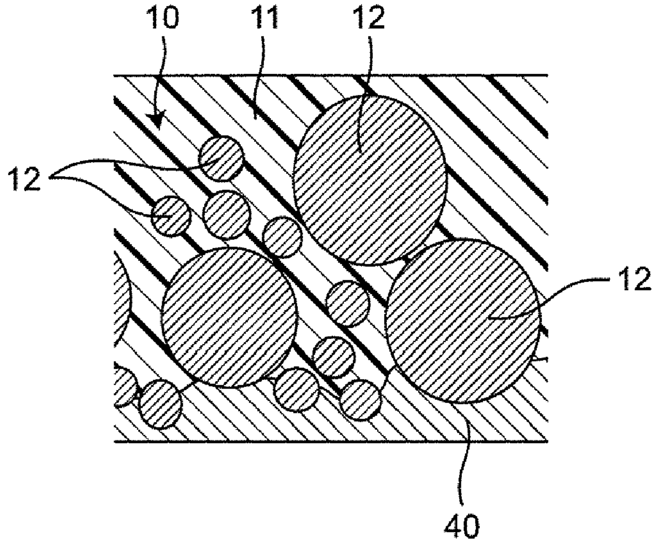
FIG. 8 is an enlarged view of an A part of FIG. 7.

Then, as illustrated in FIG. 7, the insulating films 40 are provided on the outer surfaces of the element body 10. In this case, as illustrated in FIG. 8 as an enlarged view of an A part of FIG. 7, some particles of the metal powder 12 are exposed from the resin material 11 in some cases but the some particles of the metal powder 12 are covered with the insulating films 40 on the outer surfaces of the element body 10.

Figure 9:
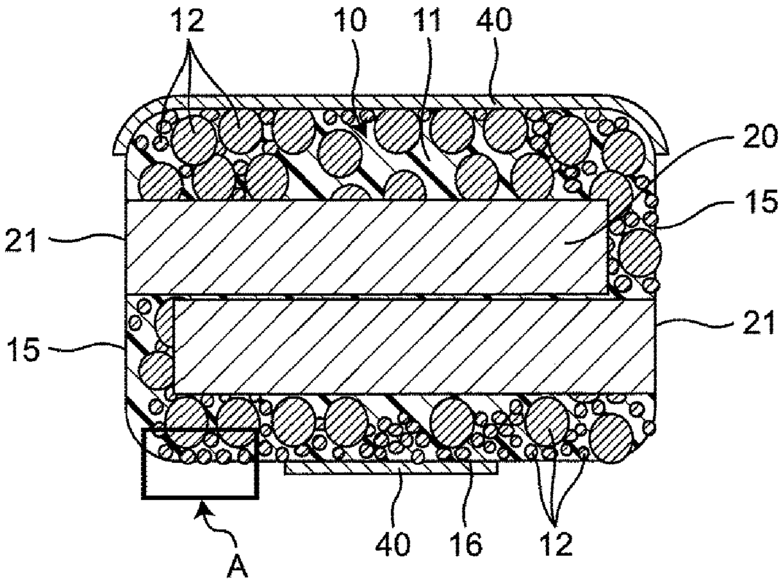
FIG. 9 is a descriptive view for explaining the method for manufacturing the electronic component.
Figure 10:
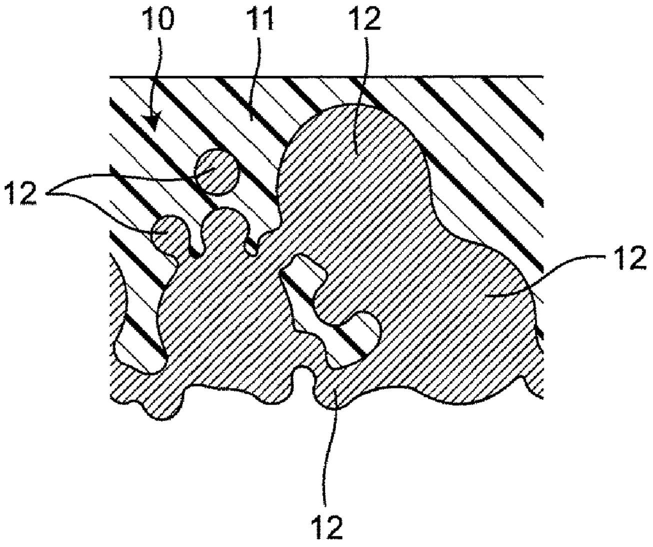
FIG. 10 is an enlarged view of an A part of FIG. 9.

Thereafter, as illustrated in FIG. 9, regions in which the outer electrodes 30 are formed on the outer surfaces of the element body 10 are irradiated with the laser. As is described in detail, laser irradiation surfaces are provided on both of the end surfaces 15 of the element body, the first side surface 16 of the element body at the one end surface 15 side, and the first side surface 16 of the element body at the other end surface 15 side. In this case, the insulating films 40 are removed from the surfaces irradiated with the laser. Furthermore, as illustrated in FIG. 10 as an enlarged view of an A part of FIG. 9, the plurality of particles of the metal powder 12 are exposed from the resin material 11 and at least some particles (plurality of particles) of the metal powder 12, which are exposed, are made contact with one another on the laser irradiation surfaces of the element body 10. That is to say, the element body 10 is irradiated with the laser such that some particles of the metal powder 12 of the element body are exposed from the resin material and make contact with one another. This process is referred to as a laser irradiation process. That is to say, the insulating films 40 and the resin material 11 are removed by being irradiated with the laser and the metal powder 12 is exposed from the resin material 11. Furthermore, at least some particles of the metal powder 12, which make contact with one another, are molten with the laser and bonded to one another. A wavelength of the laser is, for example, 180 nm to 3000 nm. The wavelength of the laser is 532 nm to 1064 nm more preferably. By setting the wavelength of the laser to be in the range, the particles of the metal powder can be bonded to one another and the plating speed can be increased while suppressing damage on the element body due to the laser irradiation. The wavelength of the laser is set in consideration of damage on the element body 10 and reduction in processing time. Furthermore, irradiation energy of the laser which is irradiated is set to be a range of 1 W/mm$^2$ to 30 W/mm$^2$ preferably, and 5 W/mm$^2$ to 12 W/mm$^2$ more preferably.

As described above, the insulating films 40 are removed from the regions (hereinafter, laser target regions) irradiated with the laser. Therefore, in the electronic component including the insulating films 40, the laser target regions can be defined as regions surrounded by the insulating films 40. The laser target regions are regions that are formed on the laser irradiation surfaces and on which the outer electrodes 30 are formed. It is preferable that the regions (that is, the laser target regions) on which the outer electrodes 30 are planned to be formed be surrounded by ultraviolet ray-absorbing resin, and then, be irradiated with the laser. With this irradiation, influence by the laser on regions other than the regions on which the outer electrodes 30 are planned to be formed can be suppressed and the outer electrodes 30 can be selectively formed. It is sufficient that the ultraviolet ray-absorbing resin is appropriately changed to resin absorbing another light beams depending on the wavelength of the laser which is irradiated.

After the laser irradiation process, as illustrated in FIG. 3 and FIG. 4, the outer electrodes 30 (metal films) are formed using plating on the laser irradiation surfaces of the element body 10. This process is referred to as a metal film formation process. As is described in detail, the one outer electrode 30 is continuously provided on the one end surface 15 and the first side surface 16 at the one end surface 15 side and the other outer electrode 30 is continuously provided on the other end surface 15 and the first side surface 16 at the other end surface 15 side.

When plating is performed on the element body 10 by electrolytic plating, electroless plating, or the like, the plating film is deposited from the exposed, molten, and bonded metal powder 12 as a point of origin. Then, the plating film is gradually formed so as to cover the overall laser irradiation surfaces, and the L-shaped outer electrodes 30 are formed. In this case, the metal films may be formed using the plating after a plating catalyst is applied to the laser irradiation surfaces of the element body 10, thereby improving productivity of the plating. The plating catalyst in the embodiment is metal improving a plating growth speed. Examples of the plating catalyst include a solution of metal, and metal powder and metal complex of nano-scale. The type of plating metal may be, for example, Pd, Ag, or Cu.

It should be noted that the portions of the outer electrodes 30, which are located on the end surfaces 15, may be covered with insulating films. For example, the outer electrodes 30 are covered with the insulating films made of a resin material or the like by a method such as spraying or dipping. With this covering, only the portions of the outer electrodes 30, which are located on the first side surface 16, are exposed to the outside. The L-shaped outer electrodes 30 can be formed as the outer electrode 30 (bottom electrode) in a film with a simple structure.

In the case in which the outer electrodes 30 are configured by three layers of metal films, Ni plating layers, and Sn plating layers, when covering with the insulating films for forming the bottom electrode is performed finally, there is a risk that a solder comes around to end portions of the Sn plating layers between the insulating films and the Sn plating layers to break the insulating films upon mounting of the substrate. To avoid this risk, it is preferable that after the L-shaped electrodes are formed by the metal films, the bottom electrode be formed with covering the insulating films, and then, the Ni plating layer and the Sn plating layer be formed on only the bottom surface.

With the electronic component 1, some particles (the plurality of particles) of the metal powder 12 are exposed from the resin material 11 and make contact with one another on the outer surfaces of the element body 10. That is to say, the plurality of particles configure the network structure connected with one another. Accordingly, when the outer electrodes 30 (metal films) are formed by performing plating directly on the element body 10, an electric current is easy to be supplied with the network structure of the metal powder 12 and the plating deposition speed is improved, thereby easily forming the outer electrodes 30 with low resistances.

By contrast, no network structure of the metal powder arises a problem that the plating speed is extremely low because of shortage of supplied power from the metal powder even when electrolytic plating is performed on the element body. Furthermore, even when electroless plating is performed by applying a catalyst such as palladium to the element body, a plating film (metal film) having a sufficient film thickness cannot be formed.

When cutting processing and barrel finishing as pre-processes of the plating process are performed in the electrolytic plating, the metal powder is shed and places to which current is supplied become insufficient. This makes the plating film difficult to be deposited and the plating speed is largely decreased. The cutting processing and the barrel finishing make the metal powder easy to be separated from the resin material, resulting in a problem that close contact strength of the plating film to the element body is decreased.

With the above-described electronic component 1, at least some particles of the metal powder 12, which make contact with one another, are bonded to one another by being molten, for example. With this, the network structure of the metal powder 12 becomes strong and the outer electrodes 30 are formed more easily.

With the above-described electronic component 1, the ratio of the metal powder 12 the particles of which make contact with one another in the element body 10 is lower than the ratio of the metal powder 12 the particles of which make contact with one another on the outer surfaces of the element body 10. Therefore, an insulation property can be kept in the element body 10 and voltage endurance can be improved.

With the above-described electronic component 1, the outer electrodes 30 make contact with the metal powder 12 the particles of which are exposed from the resin material 11 and make contact with one another. Therefore, the outer electrodes 30 can be formed by performing plating directly on the element body 10 and the outer electrodes 30 with low resistances can be formed.

With the above-described electronic component 1, the insulating films 40 are provided on the outer surfaces on which no outer electrode 30 is formed. Therefore, the insulating property of the electronic component 1 can be ensured. The outer electrodes 30 can be formed using the insulating films 40 as masks.

With the above-described electronic component 1, the metal powder 12 contains at least one metal of Pd, Ag, and Cu and the at least one metal thereof can therefore be used as the plating catalyst, thereby improving productivity of the plating. Furthermore, a filling rate of the powder of Fe or the alloy containing Fe in the element body 10 can be improved by setting the average particle diameter of the at least one metal to be lower than the average particle diameter of the powder of Fe or the alloy containing Fe, thereby improving magnetic permeability.

With the above-described electronic component 1, the metal powder 12 the particles of which make contact with one another is present in the regions from the outer surfaces of the element body 10 to the depth equivalent to twice the maximum peak position of the particle size distribution of the metal powder 12. Therefore, the outer surfaces of the element body 10 have conductivity whereas the insulation property is kept in the element body 10, thereby improving the voltage endurance.

With the above-described electronic component 1, the metal powder 12 the particles of which make contact with one another is present in the regions from the outer surfaces of the element body 10 to the depth of 100 μm. Therefore, the conductivity of the outer surfaces of the element body 10 and the insulating property in the element body 10 can be ensured.

With the above-described electronic component 1, the ratio of the exposure area of the metal powder 12 relative to the area of the exposure regions of the outer surfaces of the element body 10 is equal to or higher than 30%. Therefore, the conductivity of the outer surfaces of the element body 10 can be ensured.

With the above-described method for manufacturing the electronic component 1, the outer surfaces of the electronic component 10 are irradiated with the laser, the plurality of particles of the metal powder 12 are exposed from the resin material 11, and at least some of the plurality of exposed particles of the metal powder 12 are made contact with one another. Therefore, at least some of the plurality of exposed particles of the metal powder 12 configure the network structure connected with one another. Accordingly, when the outer electrodes 30 are formed by performing plating directly on the element body 10, an electric current is easy to be supplied with the network structure of the metal powder 12 and the plating deposition speed is improved, thereby easily forming the outer electrodes 30 with low resistances.

With the above-described method for manufacturing the electronic component 1, at least some particles of the metal powder 12, which make contact with one another, are molten with the laser and bonded to one another. Therefore, the network structure of the metal powder 12 becomes strong and the outer electrodes 30 are formed more easily.

With the above-described method for manufacturing the electronic component 1, the outer electrodes 30 are formed on the laser irradiation surfaces of the element body 10 using the plating. Therefore, the outer electrodes 30 can be formed by performing plating directly on the element body 10, thereby easily forming the outer electrodes 30 with low resistances.

In particular, usage of the laser enables the outer electrodes 30 having desired shapes to be formed. Furthermore, usage of the laser enables the metal powder 12 to be partially fused, enables irregularities to be provided on the surfaces of the metal powder 12 by being molten the surfaces thereof, and enables only the insulating film on the surface to be selectively eliminated. Moreover, the plating film can be provided in recesses in the surfaces of the metal powder 12, thereby improving an anchoring effect of the plating film.

The present disclosure is not limited to the above-described embodiment and design can be changed in a range without departing from the gist of the present disclosure.

Although the outer electrodes are used as an example of the metal films in the above-described embodiment, protection films protecting the outer surfaces of the element body or bond films for bonding with another member may be employed. Although the electronic component includes the outer electrodes as an example of the metal films in the above-described embodiment, the electronic component may include no metal film. For example, when the electronic component is mounted on a mounting substrate, a metal film may be attached to the electronic component later as a bond member for bonding the electronic component to the mounting substrate.

Although the electronic component is configured as the coil component in the above-described embodiment, the electronic component may not necessarily include the coil conductor. For example, the electronic component may include a capacitor. Alternatively, the electronic component may be a permanent magnet.

Example

As illustrated in FIG. 9, the portions on which the outer electrodes are formed were irradiated with $YVO_4$ laser having the wavelength of 1064 nm. Processing was performed with irradiation energy of 5 W/mm$^2$ and 12 W/mm$^2$. Then, reflection electron images of sites irradiated with the laser were shot with conditions of an acceleration voltage of 10 kV, an emission current of 40 μA, a WD of 10 mm, and an objective movable diaphragm of 4 using SU-1510 manufactured by Hitachi High-Technologies Corporation. Binarization decision of the metal powder and the other portions was performed on the shot images by image processing to calculate the area ratio (metal exposure ratio) of the metal powder. That is, the metal exposure ratio is defined as a ratio of the metal powder that is exposed in the exposure regions. Thereafter, the outer electrodes were formed by performing Cu plating by electrolytic barrel plating with conditions of a current value of 15 A, a temperature of 55° C., and a plating time of 180 minutes in all cases.

Subsequently, the number of pieces with incomplete deposition of plating was counted by checking outer appearances thereof. A chip on which equal to or higher than 50% of plating is not deposited on the portions irradiated with the laser was determined to be the chip with incomplete deposition of plating. Furthermore, the number of chips on which an L value was decreased at 10 MHz was counted by measuring inductances.

Table 1 indicates an experimental result.

TABLE 1

| LASER ENERGY (W/mm$^2$) | METAL EXPOSURE RATIO (%) | INCOMPLETE DEPOSITION OF PLATING (PIECE) | DECREASE IN L VALUE (PIECE) | FILM FORMATION SPEED (nm/min) |
|---|---|---|---|---|
| ZERO | 59 | 50/100 | 0/100 | 1 |
| 5 | 61 | 0/100 | 0/100 | 37 |
| 12 | 72 | 0/100 | 0/100 | 56 |

As indicated in Table 1, when the laser irradiation energy was 0 W/mm$^2$, the metal exposure ratio was 59%, the incomplete deposition of plating was observed in 50 pieces among 100 pieces, decrease in the L value was observed in no piece among 100 pieces, and a film formation speed was 1 nm/min. The film formation speed was measured by polishing a cross section. The film formation speed was calculated by measuring thicknesses at five points and dividing an average value thereof by a plating period of time.

When the laser irradiation energy was 5 W/mm$^2$, the metal exposure ratio was 61%, the incomplete deposition of plating was observed in no piece among 100 pieces, the decrease in the L value was observed in no piece among 100 pieces, and the film formation speed was 37 nm/min.

When the laser irradiation energy was 12 W/mm$^2$, the metal exposure ratio was 72%, the incomplete deposition of plating was observed in no piece among 100 pieces, the decrease in the L value was observed in no piece among 100 pieces, and the film formation speed was 56 nm/min.

As indicated in Table 1, when the laser was not irradiated, almost no plating was formed. On the other hand, when the network structure was formed by irradiating the laser, the film formation speed was improved and no incomplete deposition of plating was generated. Furthermore, the decrease in the L value of the chip was not generated. It was found that as the laser irradiation energy was higher, the film formation speed was increased.

Figure 11A:
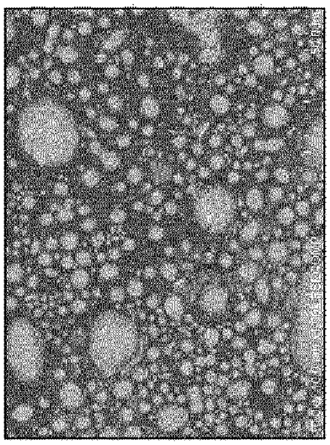
FIGS. 11A through 11C illustrate images of a surface of the element body when laser is irradiated and is not irradiated.
Figure 11B:
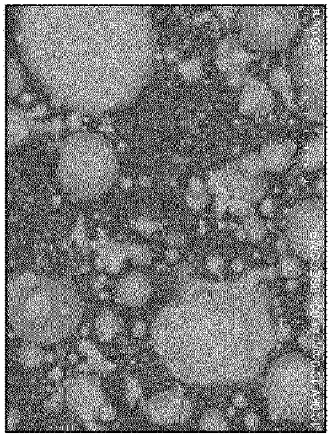
Figure 11C:
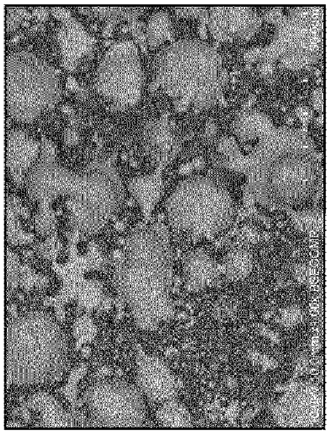

FIGS. 11A through 11C illustrate images indicating the surface of the element body when the laser is irradiated or is not irradiated. In FIGS. 11A through 11C, portions with a white color indicate the metal powder. FIG. 11A illustrates the case in which the laser is not irradiated and no network structure of the metal powder is formed. FIG. 11B illustrates the case in which the laser irradiation energy is set to 5 W/mm$^2$ and the network structure of the metal powder is formed. FIG. 11C illustrates the case in which the laser irradiation energy is set to 12 W/mm$^2$ and the network structure of the metal powder is sufficiently formed.

As a result of the above-described experiment, it is considered that the network structure of metal was formed by laser irradiation to establish a state in which a current is easy to flow.

It is considered that the plating growth speed is increased when a palladium solution is made to adhere to the element body as preprocessing of the plating. The palladium solution can be applied by an ink jet technique or the like. In this case, the metal powder forming the network structure contains Pd in addition to the metal magnetic particles containing Fe. It is considered that the effect is further enhanced by dipping a chip into ink containing Cu or Ag with low resistivity and causing it to be partially interposed in the network structure. In this case, metal powder or metal complex of nano-scale is employed more preferably.

What is claimed is:

1. A method for manufacturing an electronic component comprising irradiating an outer surface of an element body made of a composite material of a resin material and metal powder with laser such that a plurality of particles of the metal powder are exposed from the resin material and make contact with one another, wherein the particles are molten and bonded to one another by irradiating the outer surface with the laser in the irradiating and remain bonded to one another in the electronic component.

2. The method for manufacturing the electronic component according to claim 1, further including forming a metal film covering the particles on a surface of the element body, which has been irradiated with the laser, by plating the element body after the irradiating.

3. The method for manufacturing the electronic component according to claim 1, further including applying a plating catalyst to a surface of the element body, which has been irradiated with the laser, between the irradiating of the laser and the forming of the metal film.

* * * * *